United States Patent [19]
Hsu et al.

[11] Patent Number: 5,429,439
[45] Date of Patent: Jul. 4, 1995

[54] LINEAR BALL GUIDE ASSEMBLY

[75] Inventors: Wu C. Hsu; Chao S. Chang, both of Taichung, Taiwan

[73] Assignee: Hiwin Technologies Corp., Taichung, Taiwan

[21] Appl. No.: 253,488

[22] Filed: Jun. 3, 1994

[51] Int. Cl.⁶ .............................................. F16C 29/06
[52] U.S. Cl. ............................................ 384/45; 384/13
[58] Field of Search ...................... 384/13, 15, 43, 44, 384/45

[56] References Cited

U.S. PATENT DOCUMENTS

| | | | |
|---|---|---|---|
| 4,426,119 | 1/1984 | Mottate | 384/45 |
| 4,505,522 | 3/1985 | Tanaka | 384/45 |
| 4,784,498 | 11/1988 | Geka et al. | 384/45 |
| 4,963,038 | 10/1990 | Asano et al. | 384/45 X |
| 4,974,971 | 12/1990 | Tanaka | 384/45 |
| 5,186,544 | 2/1993 | Eder et al. | 384/15 |

*Primary Examiner*—Thomas R. Hannon
*Attorney, Agent, or Firm*—Bacon & Thomas

[57] ABSTRACT

A linear ball guide assembly for guiding a load to move smoothly and linearly along the guide rail at low frictional resistances, including a straight guide rail, a slide block, a pair of end caps, a pair of cover plates for U-shaped ball turning grooves, a pair of loaded ball retainers and two loops of balls. Both sides of the guide rail and inner sides of the slide block are formed with linear Gothic ball grooves for increasing the load capacity of the ball guide assembly. Above the ball grooves, two recirculating holes are formed on the slide block for the recirculation of balls. The end cap is formed with U-shaped ball turning grooves for guiding the loaded balls into the recirculating holes of the slide block. The balls then go through the U-shaped ball turning grooves of the opposite end cap back to the Gothic ball grooves to complete the recirculating loop of the balls between the slide block and the guide rail.

5 Claims, 12 Drawing Sheets

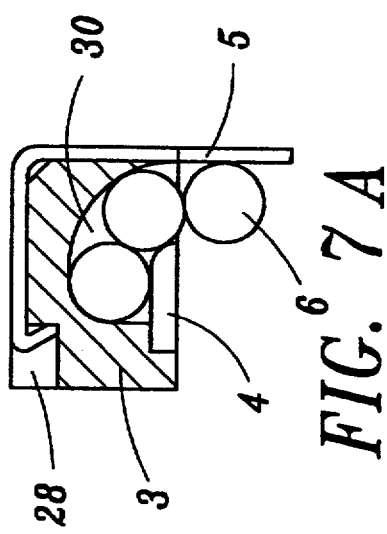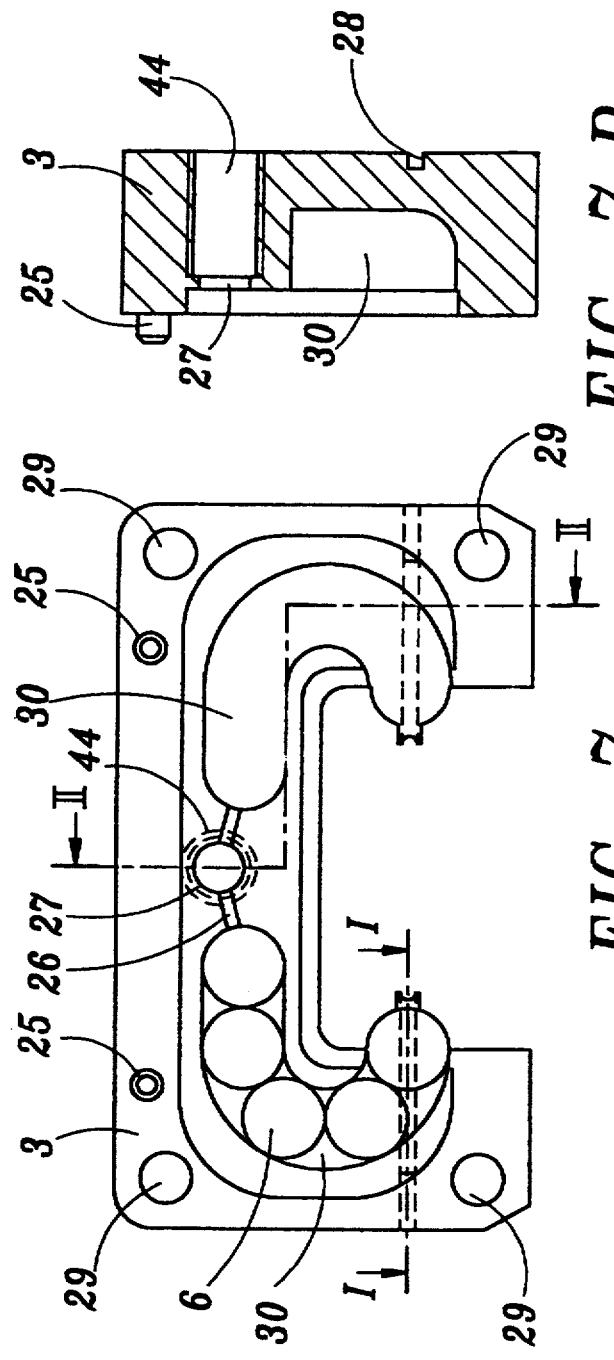

ND BALL GUIDE ASSEMBLY

LINEAR BALL GUIDE ASSEMBLY

BACKGROUND OF THE INVENTION

The present invention relates to a linear ball guide assembly which by means of ball members bears a loading force and moment in all directions and achieves a smoothly linear movement along the straight guide rail at low frictional resistance. The linear ball guide assembly includes a pair of end caps formed with substantially U-shaped ball turning grooves for smoothing recirculation of the balls and facilitating manufacturing of the linear ball guide assembly.

The conventional linear ball bearings for accurately guiding a linear movement includes a linear ball bushing bearing and a linear ball guide assembly. Such bearing and guide assemblies have several loops of balls for bearing the load and guiding the movement at low frictional resistance. The balls are restricted within a recirculating path formed by grooves or holes for loaded and unloaded balls, and ball turning grooves. Ball retainers are used to prevent the balls from dropping out of the ball grooves when the slide block is separated from the rail.

The linear ball bushing bearing is mounted on a straight shaft or rail for bearing vertical or radial loads. Usually, the moment capacity thereof is lower than that of the linear ball guide assembly. The both sides of the guide rail of some linear ball guide assemblies and the corresponding inner sides of the slide block are formed with four rows of linear arched ball grooves to form four loops of balls for increasing the load and moment capacity thereof. The manufacturing technique for the linear ball guide assembly having four arched ball grooves is more complicated. To achieve an accurate position of four ball grooves and correct shapes thereof and insure the accuracy and smoothness of the recirculation of the balls on the guide assembly so as to even the load distribution over the four loops of balls, the manufacturing cost is increased. However, in fact, due to manufacturing tolerance, when the guide assembly suffers vertical load, only the upper two loops of balls bear the load, while the lower two loops of balls are free from the load. In addition, the contacting angles between the balls and the arch ball grooves will be affected by the load, so that the load is unable to be evenly distributed over the loops of balls. Therefore, the capacity of the guide assembly is lowered.

On the other hand, the loaded ball retainer of a conventional linear ball guide rail is made of a bent metal plate with a slot. When the loaded balls enter the ball turning grooves from the ball grooves, the end corner of the slot often presents an obstacle to the balls, and the rolling of the balls will be unsmooth and create noise.

SUMMARY OF THE INVENTION

It is therefore a primary object of the present invention to provide a linear ball guide assembly in which the load and moment capacity of the linear ball guide assembly is increased. The guide assembly includes two loops of balls to bear the loading force and moment in all directions. The loaded balls roll within linear Gothic ball grooves on both sides of the guide assembly. The Gothic ball groove is formed by two arch surfaces so as to evenly distribute the load over the loaded balls. The design of the linear ball guide assembly with Gothic ball grooves is simple and the processing thereof is easy so that the manufacturing cost thereof is lowered and the accuracy of recirculation is insured.

It is a further object of the present invention to provide the above guide assembly for smoothing the recirculation of the balls and reducing the noise during recirculation. The loaded balls roll along the linear Gothic ball grooves through the ball turning grooves of the end caps into the recirculating holes becoming unloaded balls. The ball turning grooves of the end cap are U-shaped and symmetrically disposed, having a semicircular cross-section. Above the U-shaped ball turning grooves is disposed a cover plate which has grooves cooperating with the two U-shaped ball turning grooves. The grooves of the cover plate have a semicircular cross-section and are able to keep balls in the U-shaped ball turning grooves so as to complete the recirculation of balls and provide a smoother turning of the balls. Both U-shaped ball turning grooves have a semicircular path and a linear path, whereby the end of the linear path of the U-shaped ball turning grooves are close to the central portion of the end cap, so that the recirculating holes for the unloaded balls, adjacent to this end, are close to the central portion of the slide block rather than the upper corners above the Gothic ball grooves where the stresses are concentrated. Therefore, the strength of the slide block is increased. Also, the U-shaped ball turning groove can contain five balls, while in a conventional linear ball guide assembly, the ball turning groove often can only contain three or four balls. Therefore, in the present invention, more balls are used to bear the load so that the service life of the guide assembly can be prolonged. In addition, the end cap is made of plastic to reduce the running noise. Moreover, the loaded ball retainer is made of bent spring wire without affecting the rolling of the balls.

According to the above objects, the ball guide assembly of the present invention includes a guide rail, a slide block, a pair of end caps, a pair of cover plates for U-shaped ball turning grooves, a pair of loaded ball retainers, two loops of balls, a pair of wipers disposed on an outer side of the end caps, and a pair of wipers disposed under the slide block. Both sides of the guide rail and corresponding inner sides of the slide block are formed with a linear Gothic ball groove for guiding the loaded balls to move at low frictional resistance. A Gothic ball groove is formed by two arched surfaces, whereby two identical contacting angles of 45 degrees between the loaded ball and the Gothic ball groove are created. Therefore, by means of the Gothic ball grooves, the applied load is divided into a pair of component forces which are inclined 45 degrees relative to a horizontal level. Extending lines of each component force intersect with each other at the central portion of the guide rail, so that the linear ball guide assembly will not suffer extra moment. Above the ball grooves, two recirculating holes are formed through the slide block for the recirculation of unloaded balls. The end cap has a pair of U-shaped ball turning grooves for guiding the balls into the recirculating holes of the slide block. The balls then go through the U-shaped ball turning grooves of the opposite end cap back to the Gothic ball grooves to complete the loop of the balls on both sides of the linear ball guide assembly. Both U-shaped ball turning grooves have a semicircular path and a linear path for containing five balls. After going into the U-shaped ball turning grooves from the Gothic ball grooves, the balls roll to a substantially central portion of the end cap and then roll into the recirculating holes of the slide block.

The ends of the linear path of the U-shaped ball turning grooves are close to the central portion of the end cap, so that the recirculating holes for the unloaded balls, which are adjacent to these groove ends, are close to the central portion of the slide block rather than the upper corners above the Gothic ball grooves where the stresses are concentrated. The cover plate is disposed above the U-shaped ball turning grooves of the end cap to keep the balls in the turning grooves and to smooth the recirculation of the balls. Two retainers are used to prevent balls from dropping out from the ball grooves when the slide block is separated from the guide rail. By means of adjusting the dimensions of balls to exert a preload on the guide assembly, the load capacity is increased, the clearance between the slide block and guide rail is eliminated and the positioning accuracy of the movement thereof is improved.

The present invention can be best understood through the following description and accompanying drawing, wherein:

BRIEF DESCRIPTION OF THE DRAWINGS

FIG. 7 is an internal end view of the end cap showing the U-shaped ball turning grooves of the end cap;

FIG. 7A is a cross-sectional view taken along line I—I in FIG. 7;

FIG. 7B is a cross-sectional view taken along line II—II in FIG. 7;

FIG. 10A is a sectional view taken along line III—III of FIG. 10; and

DETAILED DESCRIPTION OF THE PREFERRED EMBODIMENT

Figure 1:
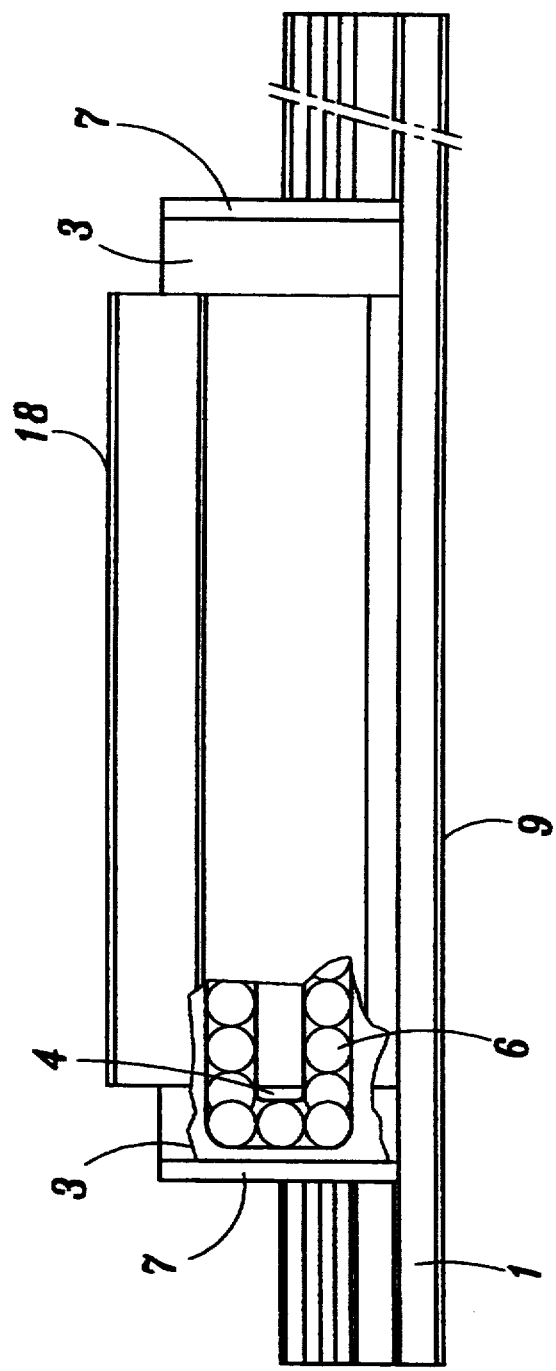
FIG. 1 is a side view of the linear ball guide assembly of the present invention.
Figure 2:
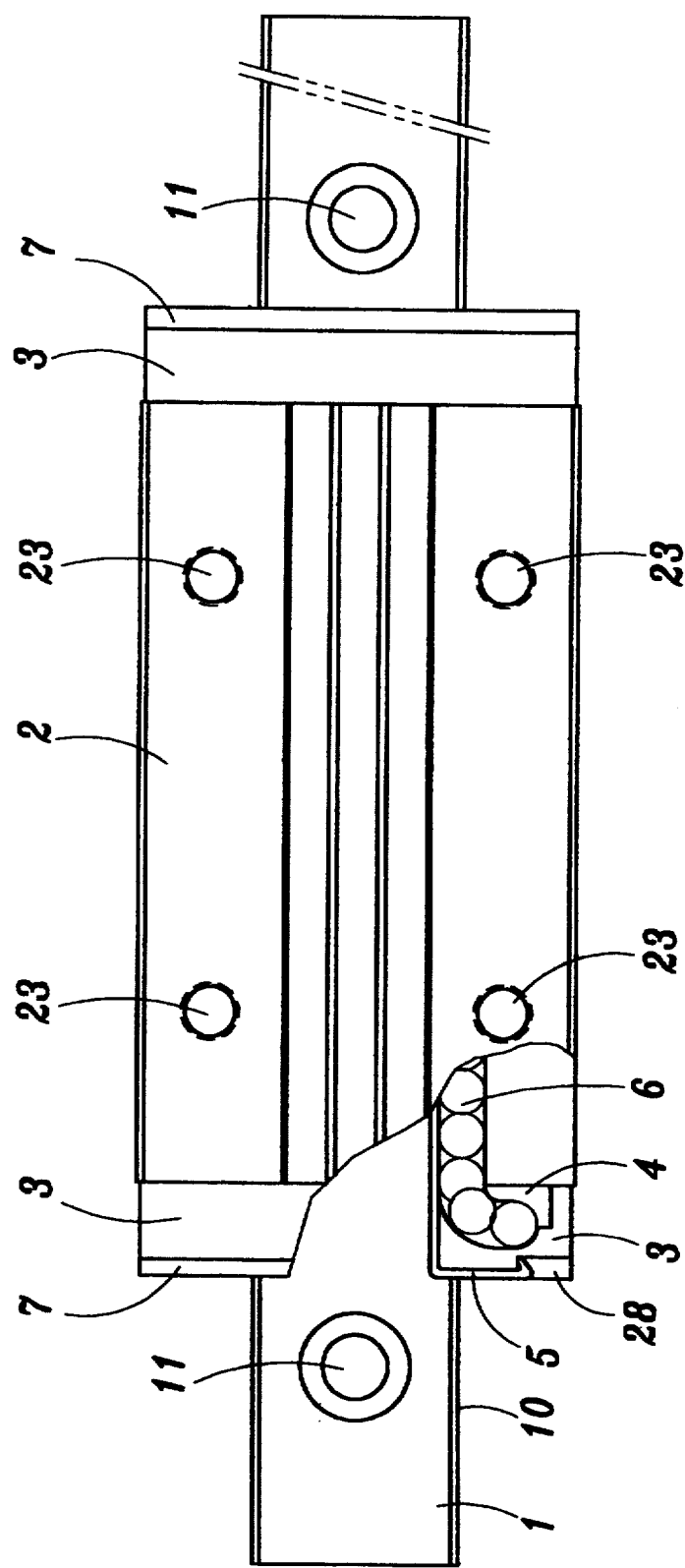
FIG. 2 is a top view thereof partially broken away.
Figure 3:
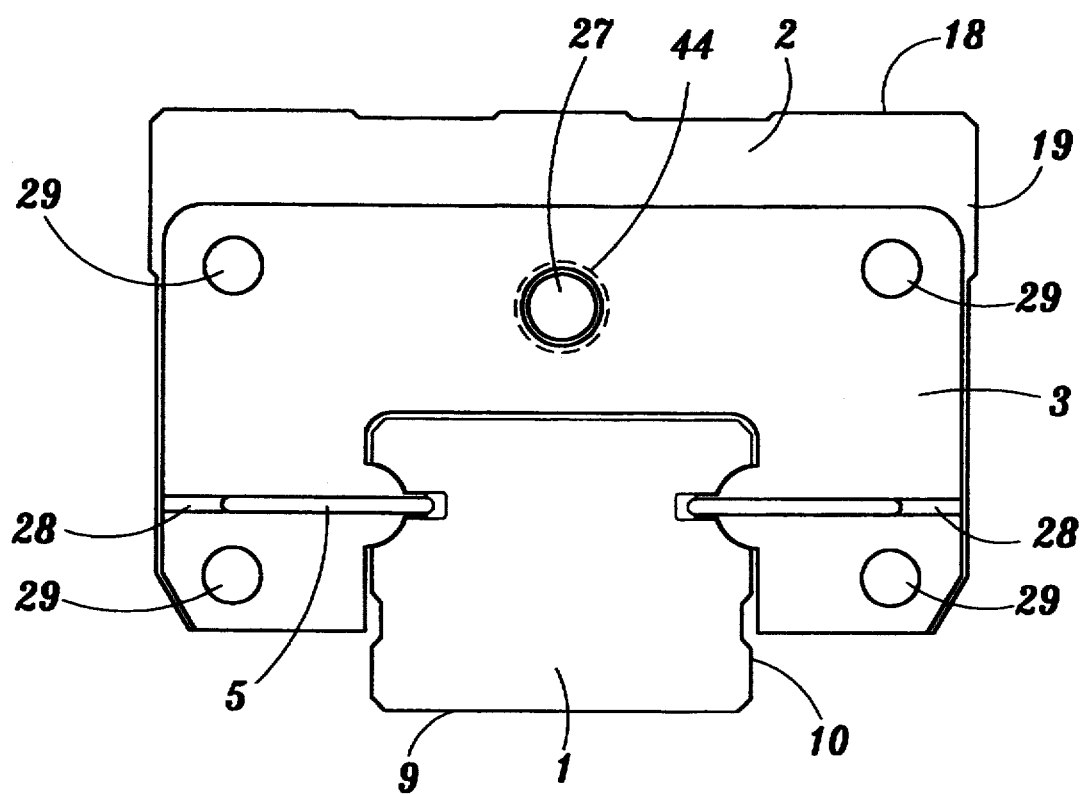
FIG. 3 is an end view thereof without wipers.
Figure 4:
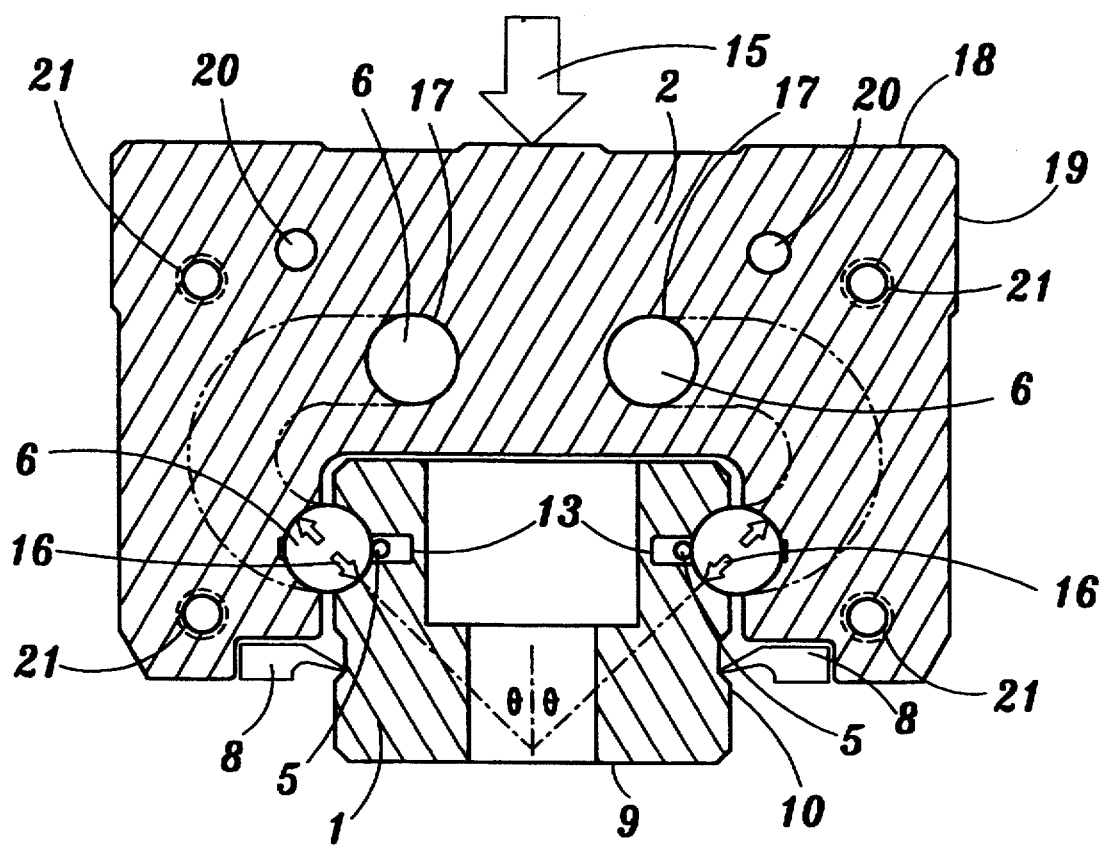
FIG. 4 is a cross-sectional view showing the assembly of the slide block, the guide rail and the balls.
Figure 5:
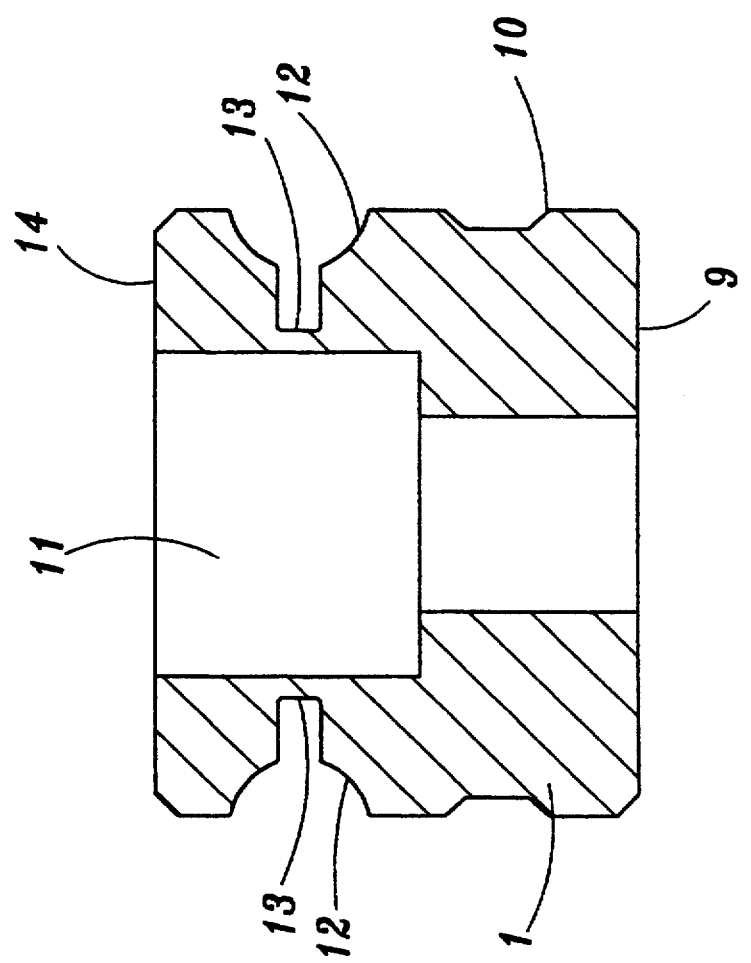
FIG. 5 is a cross-sectional view of the guide rail.
Figure 6:
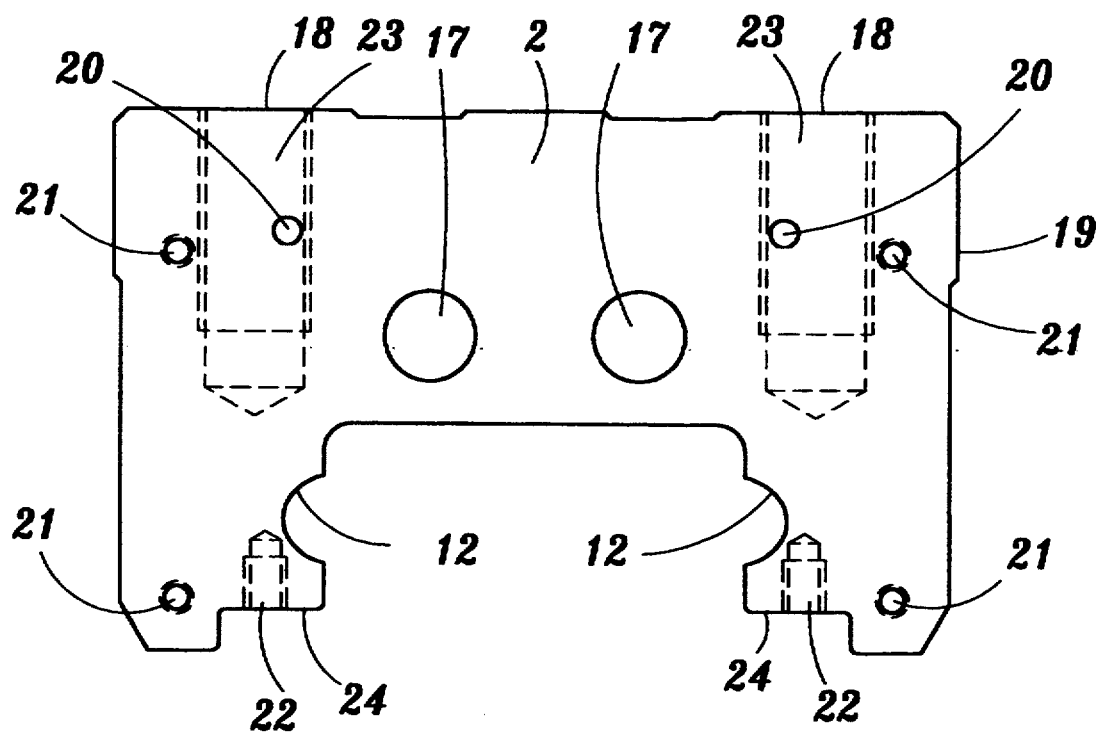
FIG. 6 is an end view of the slide block.

Please refer to FIGS. 1 to 3. The linear ball guide assembly of the present invention includes a guide rail 1, a slide block 2, a pair of end caps 3, a pair of cover plates 4 for U-shaped ball turning grooves, a pair of ball retainers 5, two loops of balls 6, a pair of wipers 7 disposed on an outer side of the end caps 3, and a pair of wipers 8 disposed under the slide block 2 (see FIG. 4). The rail 1 has a bottom face 9 and two lateral faces 10 which serve as reference planes. The rail 1 is drilled with holes 11 for mounting the rail 1. As shown in FIGS. 4, 5 and 6, both sides of the rail 1 and corresponding inner sides of the slide block 2 are formed with linear Gothic ball grooves 12 for guiding the loaded balls 6 to move at low frictional resistance. The Gothic ball grooves 12 are formed with escaping grooves 13 for avoiding the contact between the retainers 5 and the ball grooves 12 and thus avoiding unsmoothness of the recirculation of loaded balls 6. A Gothic ball groove 12 is formed by two straight arched surfaces, whereby two identical contacting angles $\theta$ (theoretically 45 degrees) between the loaded ball 6 and the Gothic ball grooves 12 are created. Therefore, as shown in FIG. 4, by means of two ball grooves 12, the applied load 15 is divided into a pair of component forces 16 which are inclined 45 degrees relative to a horizontal level. Extending lines of each component force 16 intersect with each other at the central portion of the guide rail, so that the guide rail will not suffer extra moment. The Gothic ball grooves 12 enable the guide rail to adjust preload through the dimension of loaded balls 6 so as to increase the load capacity, eliminate clearance of the guide assembly and increase the positioning accuracy of the guide assembly.

As shown in FIG. 6, above the ball grooves 12, two recirculating holes 17 are formed on the slide block 2 for the recirculation of balls. The slide block 2 has a top face 18 and two lateral faces 19 which serve as reference planes for mounting of the linear ball guide assembly. The slide block 2 is additionally formed with pin holes 20 and threaded holes 21 for fixing the end caps 3 and the wipers 7. The slide block 2 is also formed with threaded holes 22 for fixing the wipers 8 and threaded holes 23 for mounting a working table thereon. As shown in FIG. 7, the end cap 3 has a pair of U-shaped ball turning grooves 30 for guiding the loaded balls into the recirculating holes 17 of the slide block 2. The balls then go through the U-shaped ball turning grooves 30 of the opposite end cap 3 back to the Gothic ball grooves 12 to complete the loop of balls 6 on both sides of the guide rail. Both U-shaped ball turning grooves 30 are composed of a semicircular path and a linear path and have a semicircular cross-section for containing five balls. The balls 6 push one another to complete the recirculation of the balls 6. After going into the U-shaped ball turning grooves 30 from the Gothic ball grooves 12, the balls 6 turn 180 degrees along the turning grooves 30 and roll to a substantially central portion of the end cap 3 into the recirculating holes 17 for the endless recirculation. In some conventional linear ball guide assemblies, the ball turning grooves often can only contain three or four balls. Therefore, in the present invention, more balls are used to bear the load so that the service life of the guide assembly can be prolonged. In addition, the ends of the linear path of the U-shaped ball turning grooves 30 are close to the central portion of the end cap 3, so that the recirculating holes 17 for unloaded balls, which are adjacent to these ends are close to the central portion of the slide block 2 rather than the upper corners of the Gothic type ball grooves 12 where the stresses are concentrated.

Figure 8A:
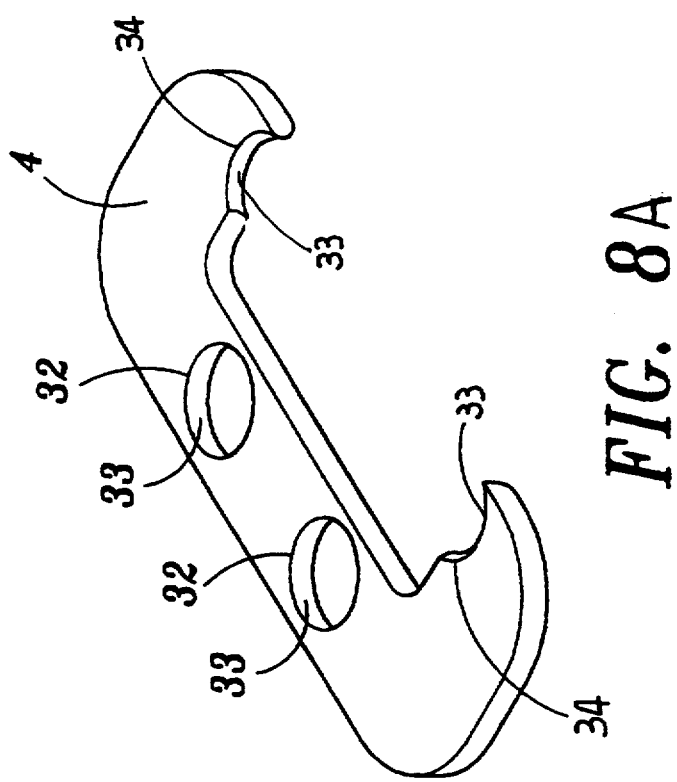
FIG. 8A is a perspective view of the end cap showing the surface facing the slide block.
Figure 8B:
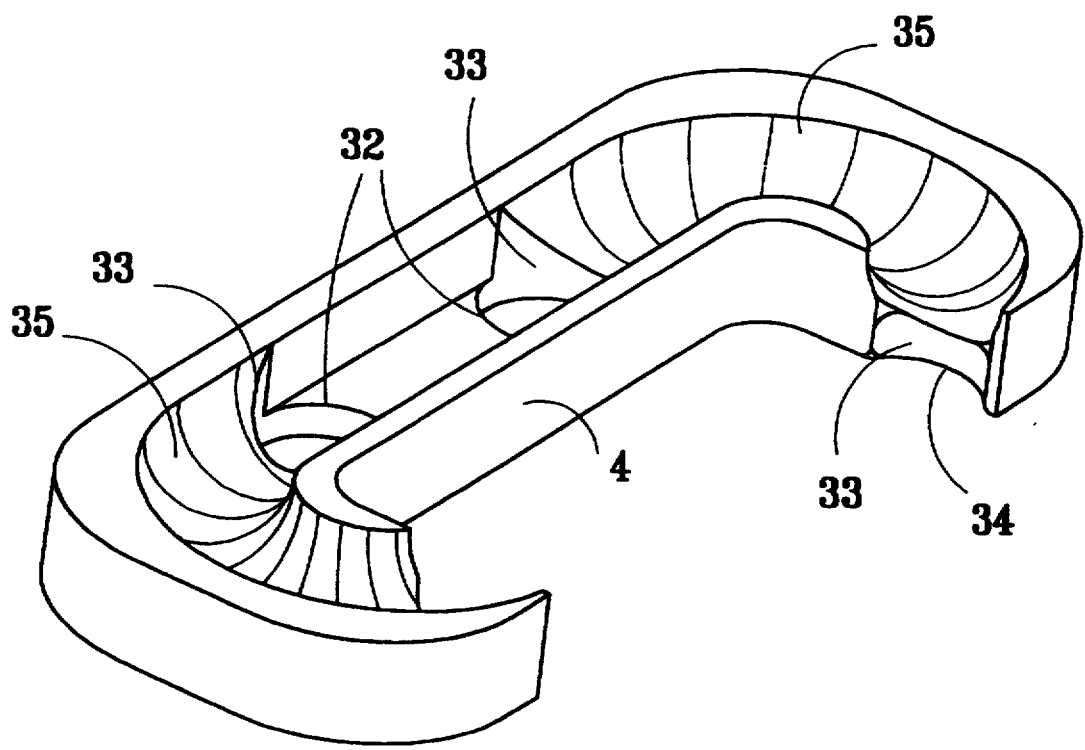
FIG. 8B is a perspective view of the cover plate showing the U-shaped ball turning groove in the surface facing the end cap.

The cover plate 4 is disposed on both U-shaped ball turning grooves 30 of the end cap 3 as shown in FIG. 8. The cover plate 4 has grooves 35 cooperating with the two U-shaped ball turning grooves 30. The grooves 35 have a semicircular cross-section for retaining the balls 6 in the ball turning grooves 30. On the cover plate 4, both semicircular ends 34 which are adjacent to Gothic ball grooves 12 and both central circular holes 32 which are adjacent to the recirculating holes 17 for unloaded balls have arched chamfer 33 for smoothing the entering of balls 6. In addition, the cover plate 4 insures that the lubricant is maintained in the ball turning area without leaking outside. The end cap 3 is provided with fixing pins 25 for maintaining the positioning accuracy between U-shaped ball turning grooves 30, recirculating holes 17 for unloaded balls and Gothic ball grooves 12 to form the ball recirculating path of the linear ball guide assembly. The end cap 3 is also formed with two lubricant grooves 26 and a lubricant hole 27 for filling lubricant therethrough to pass through the ball turning area and lubricate balls. Also, the end cap 3 is formed with two latching grooves 28 for fixing the retainers 5 and through holes 29 for fixing the end cap 3 on the slide block 2. The end cap 3 is further formed with a threaded hole 44 for mounting of grease nipple thereon. In addition, the portion of the ball turning groove 30, which is adjacent to the recirculating holes 17, is close to the lubricant hole 27 so as to shorten the lubricant grooves 26 for enhancing the lubricating effect.

Figure 9:
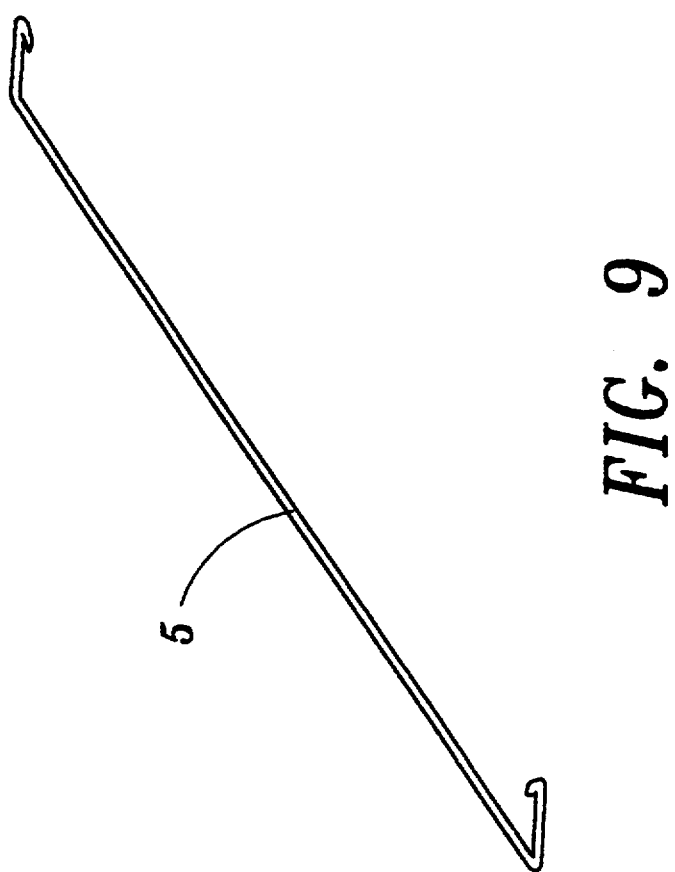
FIG. 9 is a perspective view of the loaded ball retainer.
Figure 10:
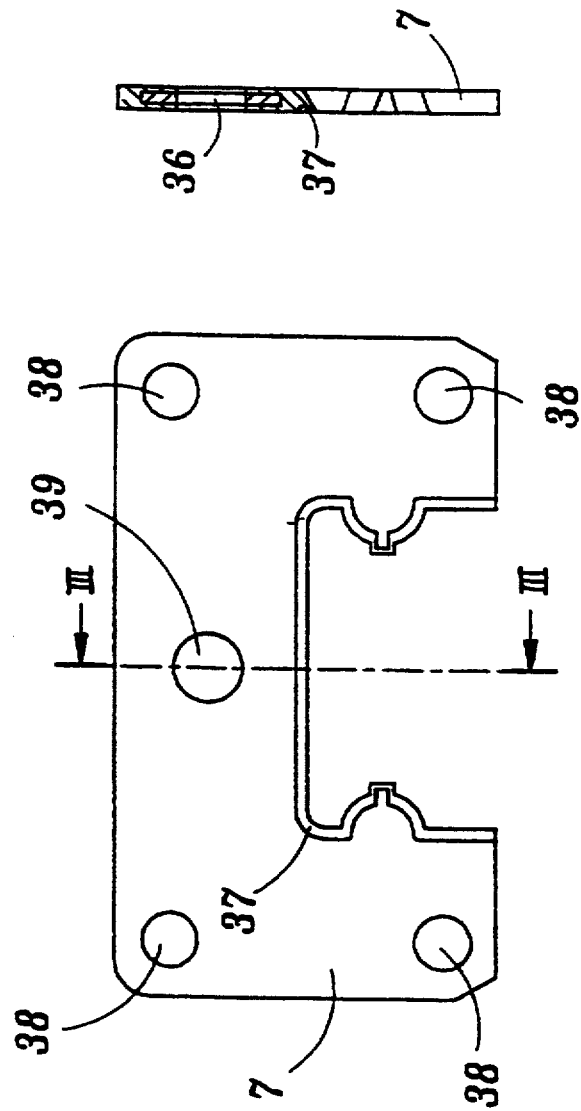
FIG. 10 is a from view of the wiper disposed on outer side of the end cap.
Figure 11:
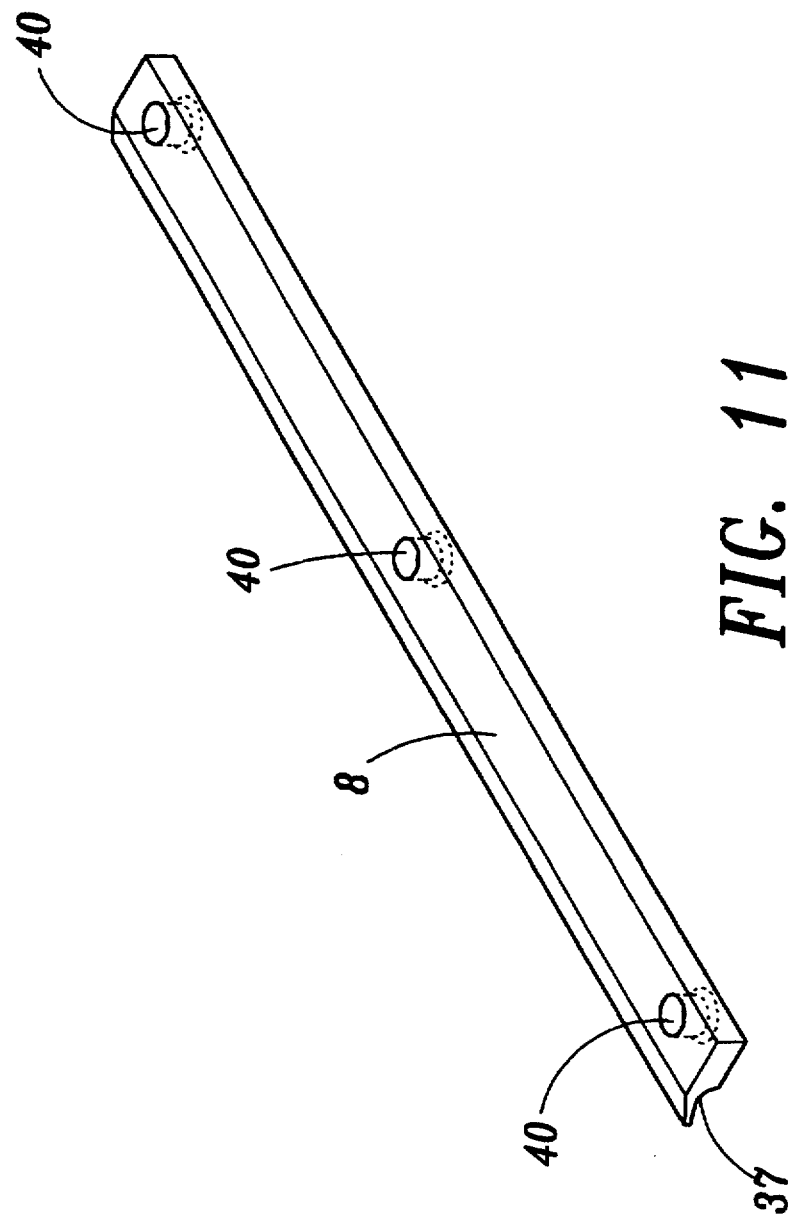
FIG. 11 is a perspective view of the wiper disposed under the slide block of the present invention.

The end cap 3 is made of plastics to reduce the running noise of balls 6. As shown in FIG. 9, the loaded ball retainers 5 are easily made of a bent spring wire and will not affect the rolling of balls 6. The retainers 5 are used to prevent balls 6 from dropping out when the slide block 2 is separated from the guide rail 1 and facilitate the mounting of the balls 6. The wipers 7 have a shape as that of the end caps 3 and are integrally made of plastic as shown in FIG. 10. Wipers 7 are disposed outside the end caps 3 for wiping off the pollutant on the rail 1 and keeping the recirculating path of the balls clean. As shown in FIG. 10A, a portion of the wiper 7 which contacts with the top face 14 of the rail 1, the Gothic ball grooves 12 and the escaping grooves 13 for the retainers 5 are formed with a recess 37, whereby this portion can tightly contact with the rail 1 and contaminates can move along the arched recess 37 without accumulating on the lip of the wiper 7. In addition, the wiper 7 is formed with a through hole 36 for mounting of the grease nipple and fixing holes 38 for fixing the wiper 7 on the end cap 3. The wipers 8 are also plastic-made and disposed under the slide block 2 and the end caps 3 for preventing contaminates from coming in. The wiper 8 is formed with conic holes 40 for passing screws therethrough to fix the wiper 8 on a groove 24 formed on the bottom side of the slide block 2.

What is claimed is:

1. A linear ball guide assembly comprising a guide rail, a slide block, a pair of end caps, a pair of cover plates for U-shaped ball turning grooves, a pair of ball retainers, two loops of balls a first pair of wipers disposed on an outer side of said end caps, and a second pair of wipers disposed under said slide block, both sides of said rail and corresponding inner sides of said slide block being formed with straight Gothic ball grooves, making an external load evenly distributed over ball loops, above said Gothic ball grooves, recirculating holes formed on said slide block for unloaded balls, said recirculation holes being close to a central portion of said slide block for increasing a load capacity of said ball guide assembly, said end caps having a pair of U-shaped ball turning grooves for guiding loaded balls into said recirculating holes of said slide block, which then go through said U-shaped ball turning grooves of the opposite end cap and back to said Gothic ball grooves to complete the loops of the balls on both sides of said guide rail, said retainers being disposed between said end caps to prevent the balls from dropping out when said slide block is separated from said guide rail, wherein said end caps are formed with two lubricant grooves and a lubricant hole for filling lubricant therethrough to pass through the ball turning area and lubricate the balls, said cover plates being disposed above said U-shaped ball turning grooves of said end caps, said cover plates having grooves which cooperate with said U-shaped ball turning grooves, said grooves of said cover plates having a semicircular cross-section for retaining the balls in said turning grooves and completing the recirculation of said balls, said cover plates having arched chamfers for smoothing the entering of balls and to insure that the lubricant is maintained in said ball turning area without leaking outside.

2. A linear ball guide assembly as claimed in claim 1, wherein said U-shaped ball turning grooves of said end caps are comprised of a semicircular path and a linear path, having a semicircular cross-section for containing five balls, whereby more balls bear the load to increase the service life of said ball guide assembly.

3. A linear ball guide assembly as claimed in claim 1, wherein said retainers are disposed between said end caps to prevent the balls from dropping out of said Gothic ball grooves when said slide block is separated from said guide rail.

4. A linear ball guide assembly as claimed in claim 1, wherein said first pair of wipers are integrally made of plastic, a portion of each of said wipers, which contacts said rail, being formed with a recess, whereby this portion is able to tightly contact said rail, making contaminates move along said rail without accumulating on said wipers.

5. A linear ball guide assembly as claimed in claim 1, wherein said second pair of wipers are disposed under said slide block in a recess defined by said slide block.

* * * * *